US007158044B2

(12) United States Patent
Mönig et al.

(10) Patent No.: US 7,158,044 B2
(45) Date of Patent: Jan. 2, 2007

(54) HANDLE ON DOORS, HOODS OR THE LIKE, ESPECIALLY FOR VEHICLES

(75) Inventors: Stefan Mönig, Schwelm (DE); Martin Witte, Ahaus (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 250 days.

(21) Appl. No.: 10/491,518

(22) PCT Filed: Oct. 18, 2002

(86) PCT No.: PCT/EP02/11661

§ 371 (c)(1),
(2), (4) Date: Mar. 31, 2004

(87) PCT Pub. No.: WO03/038216

PCT Pub. Date: May 8, 2003

(65) Prior Publication Data

US 2005/0029868 A1 Feb. 10, 2005

(30) Foreign Application Priority Data

Oct. 27, 2001 (DE) ................................ 101 53 143

(51) Int. Cl.
*G08B 21/00* (2006.01)
*B60R 25/00* (2006.01)
*E05B 3/00* (2006.01)

(52) U.S. Cl. ................ 340/686.6; 340/5.72; 292/336.3

(58) Field of Classification Search ............... 340/5.52, 340/5.72, 686.6; 292/352
See application file for complete search history.

(56) References Cited

U.S. PATENT DOCUMENTS

| | | | | |
|---|---|---|---|---|
| 4,475,415 | A * | 10/1984 | Yamamoto | 292/336.3 |
| 6,010,167 | A * | 1/2000 | Tanimoto et al. | 292/336.3 |
| 6,039,366 | A * | 3/2000 | Lewis | 292/352 |
| 6,059,329 | A | 5/2000 | Spitzley | |
| 6,075,294 | A * | 6/2000 | Van den Boom et al. | 340/426.28 |
| 6,218,933 | B1 | 4/2001 | Josserand et al. | |
| 6,429,782 | B1 * | 8/2002 | Pavatich et al. | 340/686.6 |
| 6,768,413 | B1 * | 7/2004 | Kemmann et al. | 340/5.72 |
| 2003/0029210 | A1 * | 2/2003 | Budzynski et al. | 70/278.1 |

FOREIGN PATENT DOCUMENTS

| | | |
|---|---|---|
| DE | 196 17 038 A1 | 11/1997 |
| FR | 2772818 | 6/1999 |

* cited by examiner

*Primary Examiner*—Wendy R. Garber
*Assistant Examiner*—Clara Yang
(74) *Attorney, Agent, or Firm*—Friedrich Kueffner

(57) ABSTRACT

A handle on doors, hoods, or the like especially for vehicles, with a stationary handle part, which can be mounted in a recess in the outer skin of the door, with a gripping element, which acts as a movable handle part and is supported on the stationary handle part, with an electrode of an electrical field-generating capacitor, located in the area of the stationary handle part, and with an electronic circuit for generating and monitoring this electrical field. The electronic circuit responds to the approach of a human hand to the gripping element and, if the response is positive, initiates defined functions in the motor vehicle. The electrode of the capacitor is integrated into a supplemental housing, and the supplemental housing is selectively locatable on the surface of the stationary handle part by the connector.

14 Claims, 4 Drawing Sheets

HANDLE ON DOORS, HOODS OR THE LIKE, ESPECIALLY FOR VEHICLES

The invention pertains to a handle of the type indicated in the introductory clause of Claim 1.

Handles of this type are known from DE 196 17 038 A1 and are very convenient to operate. The approach of the human hand to the handle is enough to change the electrical field produced by the electrode of the capacitor to such an extent that the change can be recognized by the monitoring circuit. When this happens, it is then possible for the desired functions in the motor vehicle to be initiated immediately without the need for any further participation by the user.

Because it should be possible only for authorized persons to activate vehicle functions, this type of activation is often used in conjunction with a so-called "keyless go" system. In this case, the authorized person carries an identification transmitter in the form of, for example, a check card. When the authorized person approaches the vehicle, the identification transmitter interacts with an identification receiver in the vehicle. If the identification receiver recognizes the authorization, it will activate the electronic circuitry. If the person approaching is not authorized and thus does not have the proper identification transmitter, no functions are activated in the vehicle.

So that these measures can be implemented, the known handle (DE 196 17 038 A1) had to be designed in a "luxury" manner. This means that a multi-part handle must be produced, so that a socket for the electrode and for additional components of the associated capacitor circuitry can be created between the individual parts of the handle. After these electrical components are installed, the individual parts of the handle must be put back together again, and the joints and spaces between them must be carefully filled with plastic. This luxury handle design therefore required numerous casting molds for the production of the individual parts, and time-consuming assembly steps are required to assemble the individual parts and to seal them off against the intrusion of media.

For price reasons, many vehicle users choose to live without this type of luxury handle and are satisfied with a simple, "standard" design, which does not offer electronic monitoring. The handles for a standard design of this type require their own injection molds and their own production processes, and they must also be stocked separately from the luxury design handles. Because of the differences between the standard design and the luxury design, the amount of fabrication, administration, and assembly work is doubled. When the handles are installed on the vehicles, attention must be paid to the difference between the two types of handles. This can be cumbersome and can also lead to errors.

The invention is based on the task of developing a reliable handle of the type indicated in the introductory clause of Claim 1 which avoids the previously mentioned disadvantages and which can be produced and assembled more economically. This is accomplished according to the invention by the additional measures cited in Claim 1, to which the following special meaning attaches.

In the invention, a very simple base handle, which is suitable both for the luxury design and for the standard design, is produced first. There is no longer any need to differentiate between the two types of handles during fabrication, for stock keeping, or even for the installation of the handle. This differentiation can wait until the last moment. Because of its double-purpose applicability, therefore, the base handle can be produced in much larger numbers and for this reason alone can be produced more cheaply. With respect to its production, the base handle comprises initially a handle of the standard design. For the luxury design, a supplemental housing, which is initially separate, is provided, into which at least the electrode for the capacitor and possibly also other components of the associated electronic circuitry are integrated. When it is desired to obtain a luxury handle, this supplemental housing is mounted afterwards on the surface of one of the handle parts. For this purpose, it is possible, for example, to provide connecting means on the stationary part of the handle, this means cooperating with complementary connecting means on the supplemental housing. Attaching the supplemental housing afterwards to the handle part thus converts the base handle intended for the standard design into the desired luxury-design handle. This conversion between the standard design and the luxury design can be performed quickly and cheaply.

If necessary, it is also possible to remove the attached supplemental housing from the handle part at a later time in order to convert, for example, a luxury design back to a standard design. This removal of the supplemental housing with its integrated capacitor electrode is also advantageous in cases where defects in the capacitor electrode or in the electronic circuitry are detected. A luxury handle can therefore be repaired quickly and cheaply if necessary according to the invention simply by replacing the supplemental housing containing the defective electronic circuitry with a new supplemental housing. The connecting means always ensure that the capacitor electrode will be positioned correctly in the handle.

Additional measures and advantages of the invention can be derived from the subclaims, from the following description, and from the drawings. The drawings illustrate the invention on the basis of an exemplary embodiment:

Figure 1:
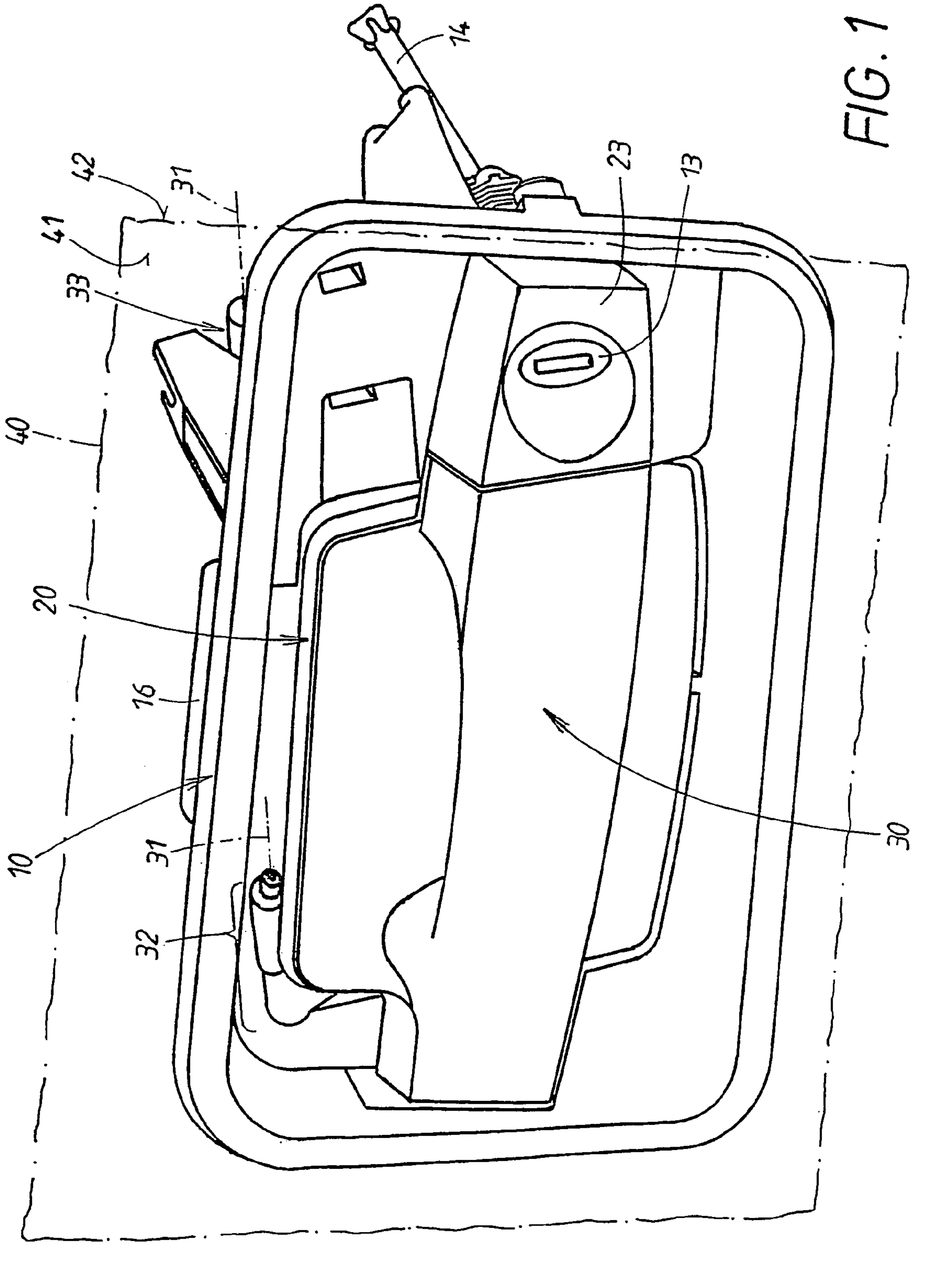
FIG. 1 shows a perspective view of the assembled handle according to the invention, where—for the sake of clarity—the door panel between the gripping element and a carrier have been made invisible, their positions being merely indicated in dash-dot line.
Figure 2:
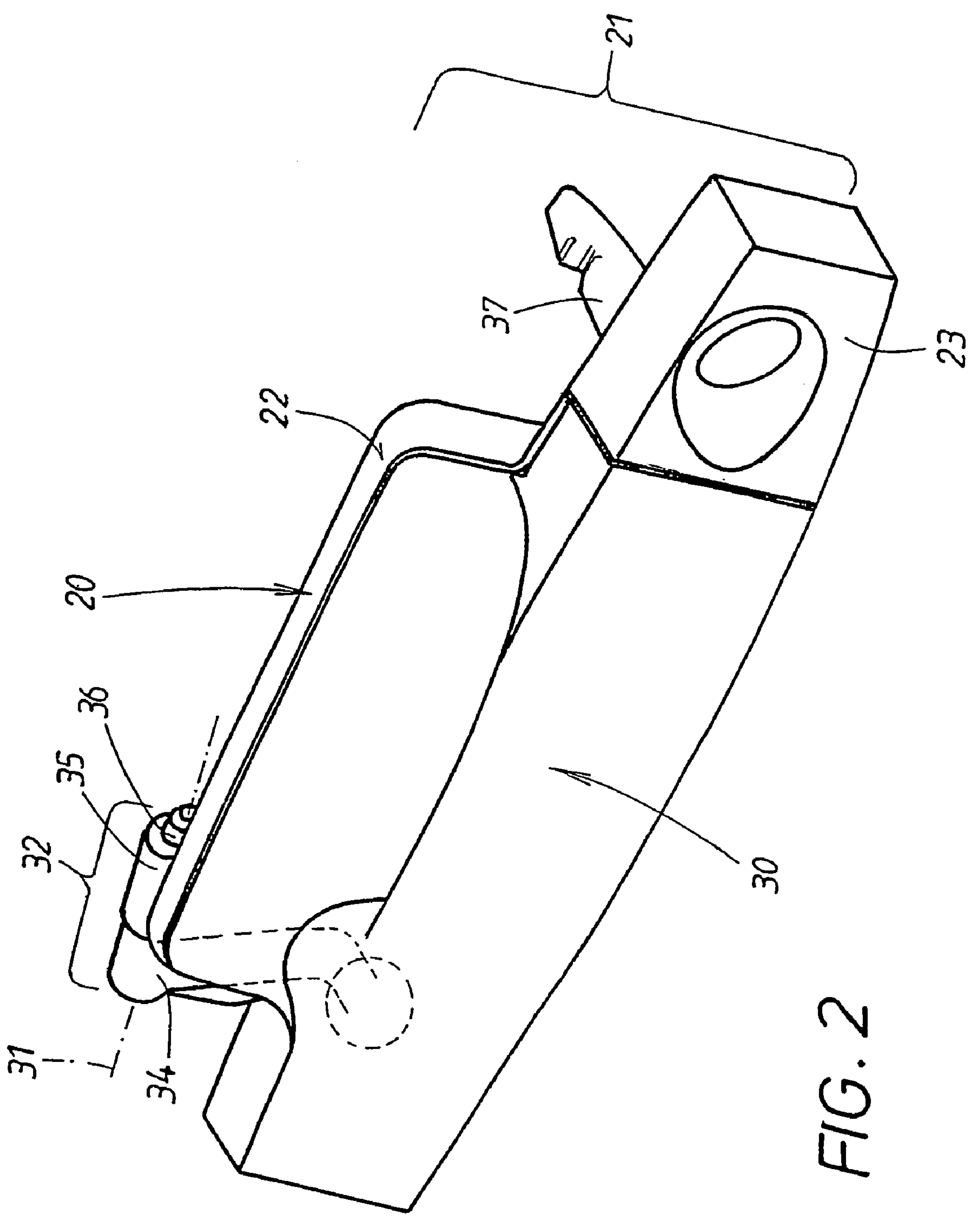
FIG. 2 shows a preassembled unit consisting of a gripping element and a gripping recess, which already belongs to the stationary part of the handle.
Figure 3:
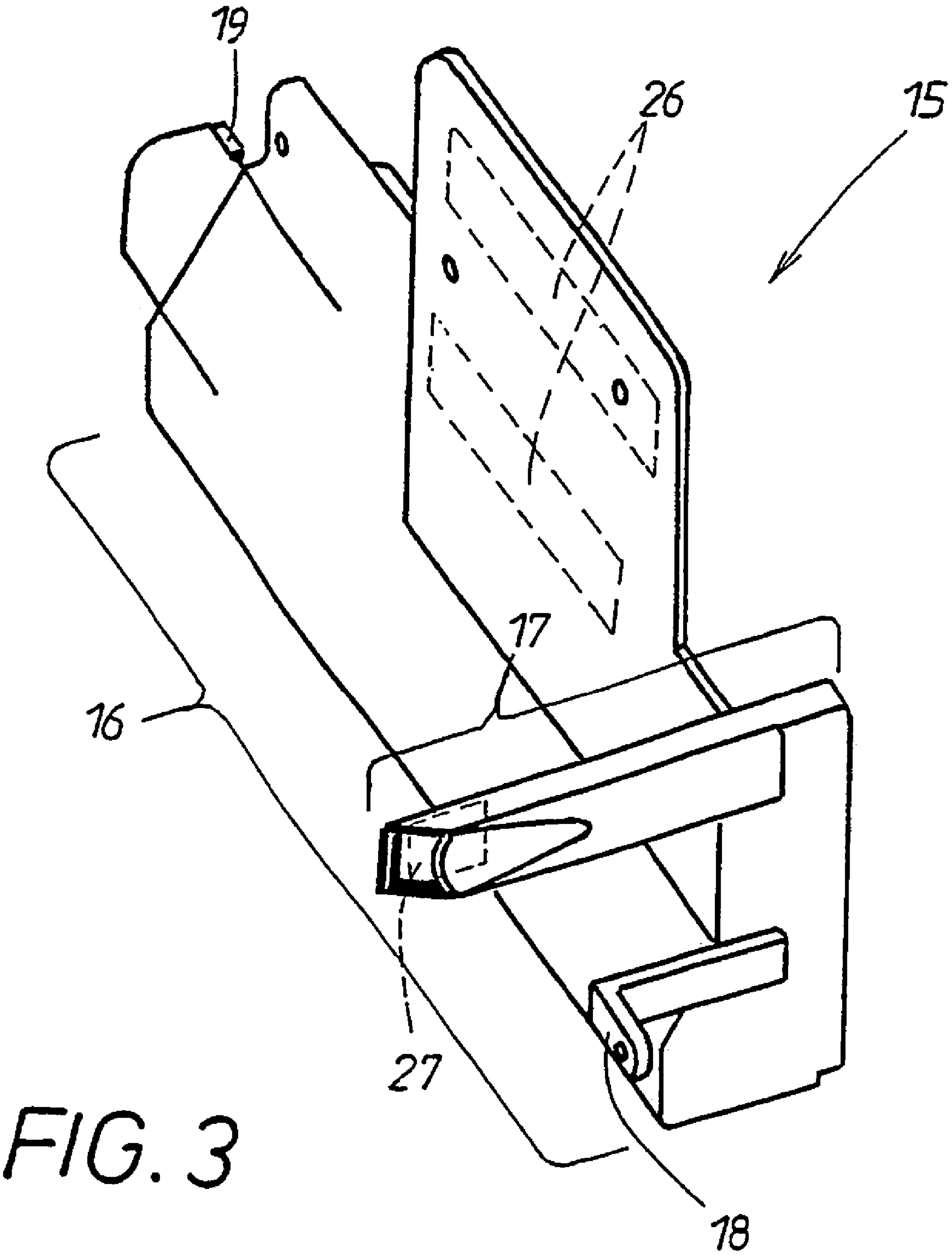
Figure 4:
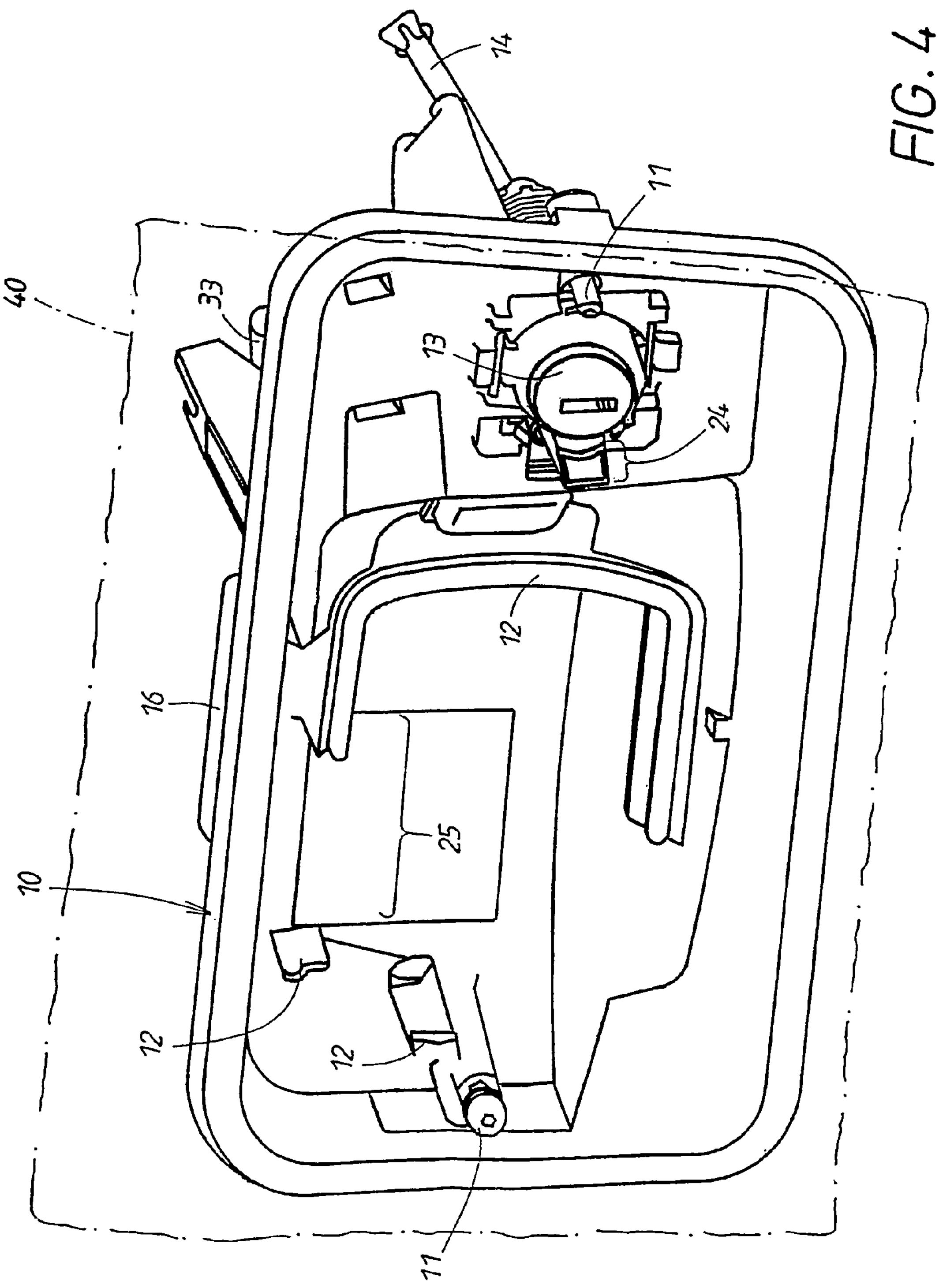

FIG. 3 shows a perspective view of a combination housing for two different capacitor electrodes with their associated circuitry; and FIG. 4 shows a perspective view similar to that of FIG. 1 of an additional element of the stationary handle part supplementing the components of FIGS. 2 and 3, after this additional element has been mounted on the outside skin of the door, which is invisible here and merely indicated in dash-dot line, where the combination housing shown in FIG. 3 has already been attached to the rear surface of the outer door skin and is therefore covered except for a small projecting piece.

In the exemplary embodiment of the inventive handle shown in FIG. 1, the stationary handle part consists of two elements 10, 20, namely, a carrier 10 and a so-called gripping recess 20. In an alternative design, it would also be possible to replace the two elements 10, 20 with a single common stationary handle part.

The inventive handle also includes a movable handle part 30, namely, a gripping element, which, in the present case, has a swivel axis 31, so that it can swivel with respect to both the gripping recess 20 and the carrier 10. For this purpose, duplicate swivel bearing parts 32, 33 are provided; although they are different in design, they act in concert with each other.

The one swivel bearing part 32 consists of an arm 34 at one end of the gripping element; a bearing block 35 on the rear surface of the gripping recess 20; and a bearing pin 36, which connects the components 34, 35. Thus, as FIG. 2 illustrates, the gripping recess 20 can be combined with the gripping element 30 to form a pre-mountable unit 21. The gripping recess 20 in this case has a profile which appears concave when seen from the outside, as a result of which the arc-shaped handle 30 can be easily gripped by a human hand.

The unit 21, as can be seen in FIG. 1, is attached to the visible outside surface 41 of the outer door skin 40, indicated here only in dash-dot line. The previously mentioned carrier 10, however, is attached to the opposite inside surface 42 of the outer door skin 40. For the sake of this attachment, the gripping recess 20 and the carrier 10 have cooperating connecting means 11. These make it possible for the two elements 10, 20 to be tensioned against each other, as a result of which the outer door skin 40 comes to rest in a sandwich-like manner between the elements 10, 20. The outer door skin has an opening (not shown), which is adapted to the outline 22 shown in FIG. 2. To make sure that the gripping recess remains in its proper position, the carrier 10 also has suitable supports 12, as can be seen in FIG. 4.

When the two elements 10, 20 of the stationary handle part are attached to each other, a connection is also established at the same time between a connecting element 37 provided at the other end of the handle and an opposing connecting element (not shown), which is a component of the second swivel bearing part 33 mentioned in conjunction with FIG. 1.

In the stationary handle part, finally, there is also a lock cylinder 13. In the present case, as FIG. 4 illustrates, this cylinder is mounted in the carrier 10, and its output part 14 is then connected to an associated lock or to the central locking system of the vehicle. As can be seen in FIG. 2, the gripping recess 20 also has an attached section 23, which extends laterally from the gripping element 30, and, as can be seen FIG. 1, it covers the end surface of the lock cylinder 13.

In the area of the stationary handle part, a two-part electrode 26 is provided, which is accommodated in the supplemental housing 16 shown in FIG. 3. This electrode belongs to a capacitor, which can build up an electrical field in the area of the gripping element 30. When a human hand approaches the gripping element 30, the electrical field is changed to such an extent that an electronic circuit designed to monitor this condition responds and initiates defined functions in the vehicle, namely, the release of the lock which is keeping the door closed. At least some of these electronic components are also installed inside the supplemental housing 16. This supplemental housing 16, as can be derived from FIG. 4 and FIG. 1, is attached to the rear surface of the carrier 10. For this purpose, the supplemental housing 16 has connecting means 18, as can be seen in FIG. 3, which cooperate with corresponding, opposing connecting means on the carrier 10 or on the gripping recess 20. As a result, the electrode 26 will always occupy a defined position with respect to the gripping element 30. To prevent disassembly by unauthorized persons, the connecting and opposing connecting means can be designed so that they cannot be detached from each other after they have been engaged.

When the inventive handle is equipped with the supplemental housing 16 containing the electrode 36, the approach of a human hand, as previously explained, has the result that locking means —under the assumption that they were in their locking position in the door lock to begin with—are moved into the release position. This occurs, of course, only if an authorized person approaches the handle. This authorized person carries an identification transmitter, which exchanges signals with an identification receiver forming part of the electronic circuitry in the supplemental housing 16. If proper authorization has been determined, the receiver actuates the electronic circuitry. It is desirable, however, to take measures to prevent the system from operating in reverse, that is, to prevent the door lock from moving from its release position into its locking position when the hand of an authorized person approaches the handle.

For this purpose, a second electrode 27, shown in FIG. 3, is used, which is installed in a separate, auxiliary housing 17. This auxiliary housing 17 ensures that this second electrode 27 is located in a different place 24 in the handle, namely, the place which the human hand of the authorized person normally approaches when the attempt is being made to lock the door lock. This place 24 is, for example, the end surface of the lock cylinder 13 mounted in the carrier 10, as illustrated in FIG. 4. The user is accustomed, after all, to move his/her hand toward the lock cylinder 13 when locking the door lock. In this case, the hand will automatically arrive in the area of the place 24, where the second electrode 27 is located if the auxiliary housing 17 has been attached.

In the present case, the auxiliary housing 17 is permanently connected to the supplemental housing 16 and forms the housing unit 15 shown in FIG. 3. This housing unit 15 can be attached by common connecting means to the rear surface of the carrier 10 so that it properly positions the two electrodes 26, 27, i.e., one at the previously mentioned place 24 near the lock cylinder 13, the other near the rear surface of the gripping recess at the desired point in the carrier 10 indicated by the number 25 in FIG. 4. The housing unit 15 also carries the contact means 19 shown in FIG. 3, which establishes the electrical connection with the power supply if the unit has been attached properly by the connecting means 18.

LIST OF REFERENCE NUMBERS

10 first element of the stationary housing part, carrier
11 connecting means for 10 or 20 to 40 (FIG. 4)
12 support for 20 on 10 (FIG. 4)
13 lock cylinder in 10 (FIG. 4)
14 output part of 13 (FIG. 4)
15 housing unit consisting of 16, 17; combination housing (FIG. 3)
16 supplemental housing for 26. (FIG. 3)
17 auxiliary housing for 27 (FIG. 3)
18 connecting means for 13 on 10 or 20 (FIG. 3)
19 contact means on 15 (FIG. 3)
20 second element of the stationary handle part, gripping recess (FIG. 2)
21 unit consisting of 20 and 30 (FIG. 2)
22 outline of 20 (FIG. 2)
23 cover section on 20 for 13 (FIG. 2)
24 location for 27 on 10 (FIG. 4)
25 location for 26 on 10. (FIG. 4)
26 first electrode in 16 (FIG. 3)
27 second electrode in 17 (FIG. 3)
30 movable handle part, gripping element (FIGS. 1, 2)
31 swivel axis of 30 with respect to 20 and 30 (FIGS. 1, 2)
32 first swivel bearing part for 30 (FIGS. 1, 2)
33 second swivel bearing part (FIG. 1)
34 arm on 30 for 32 (FIG. 2)
35 bearing block on 20 for 36 (FIG. 2)

36 bearing pin on 32 (FIG. 2)
37 connecting element on 30 for 33 (FIG. 2)
40 outer skin of door (FIG. 1)
41 outside surface of 40 (FIG. 1)
42 inside surface of 40 (FIG. 1)

The invention claimed is:

1. Handle on doors, hoods, especially for vehicles, with a stationary handle part (10, 20), which can be mounted in a recess in the outer skin of the door (40);

with a gripping element (30), which acts as a movable handle part and is supported (31) on the stationary handle part (10, 20);

with an electrode (26) of an electrical field-generating capacitor, located in the area of the stationary handle part; and with an electronic circuit for generating and monitoring this electrical field;

where the electronic circuit responds to the approach of a human hand to the gripping element (30) and, if the response is positive, initiates defined functions in the motor vehicle wherein the electrode (26) of the capacitor is integrated into a supplemental housing (16); and the supplemental housing (16) is selectively locatable by the connecting means (18) on the surface of the stationary handle part (10).

2. Handle according to claim 1, wherein the stationary handle part consists of two elements (10, 20), which can be assembled with each other, namely, a carrier (10), which is attached to the inside surface (42) of the outer door skin (40), and a gripping recess (20), which can be mounted on the outside surface (41) of the outer door skin (40).

3. Handle according to claim 2, wherein the gripping element (30) is connected by a swivel axis (31) to the gripping recess (20).

4. Handle according to claim 2, wherein connecting means (11) are located between the gripping recess (20) and the carrier (10), which is mounted on the outer door skin (40), which connecting means hold these two parts on opposite sides (41, 42) of the outer door skin (40).

5. Handle according to claim 1, wherein the supplemental housing (16) is located on the rear surface of the carrier (10).

6. Handle according to claim 1, wherein complementary connecting means (18) are located on the surface of the stationary handle part (10) and on the supplemental housing (16), and in that, after these connecting means have engaged with each other, they hold the electrode (26) of the capacitor in a defined position with respect to the gripping element (30).

7. Handle according to claim 6, wherein the connecting means (18) are undetachable after they have engaged with each other.

8. Handle according to claim 1, wherein one of the functions initiated after a positive response consists in that locking means provided in the door lock are moved from the normally present locking position into a release position.

9. Handle according to claim 1, wherein at least one additional electrode (27) of second capacitor is provided for the initiation of other functions in the motor vehicle; in that the additional electrode (27) is integrated into an auxiliary housing (17), which can be located, if desired, in a different place (24) on the surface of the handle parts (10, 20); and in that a separate evaluation circuit is provided to generate and to monitor an additional electrical field, where this separate evaluation circuit responds to the approach of the human hand to a different place on the stationary or movable handle part and initiates these other functions.

10. Handle according to claim 9, wherein this other function in the motor vehicle consists of switching the unlocked door lock back into its locking position.

11. Handle according to claim 9, wherein the auxiliary housing (17) and the supplemental housing (16) are permanently connected to each other and can be mounted by means of common fastening means (18) to the surface of the handle parts (10, 20, 30).

12. Handle according to claim 11, wherein the auxiliary housing (17) is designed as an integral part of the supplemental housing (16) and forms together with it a housing unit (15) which can be mounted in a single operation.

13. Handle according to claim 9, where the stationary handle part (20) has a visible-side cover section (23), which represents an extension of the at-rest gripping element (30), under which cover section a lock cylinder (13) can be located, wherein the auxiliary housing (17) with its additional electrode (27) is located in the area (24) of this cover section (23).

14. Handle according to claim 13, wherein the cover section (23) is a component of the gripping recess (20); and in that the carrier (10) has an opening, through which, during assembly, the auxiliary housing (17) with its associated additional electrode (27) or the corresponding area of the housing unit (15) consisting of the combination of the supplemental and auxiliary housings (16, 17) is passed.

* * * * *